(No Model.)

K. R. ACKERMANN.
CULINARY UTENSIL.

No. 568,151. Patented Sept. 22, 1896.

Witnesses
Inventor
Kibbie R. Ackermann
By H. B. Willson.
Attorney

UNITED STATES PATENT OFFICE.

KIBBIE R. ACKERMANN, OF ROCHESTER, MINNESOTA.

CULINARY UTENSIL.

SPECIFICATION forming part of Letters Patent No. 568,151, dated September 22, 1896.

Application filed August 5, 1896. Serial No. 601,722. (No model.)

*To all whom it may concern:*

Be it known that I, KIBBIE R. ACKERMANN, a citizen of the United States, residing at Rochester, in the county of Olmsted and State of Minnesota, have invented certain new and useful Improvements in Culinary Utensils; and I do declare the following to be a full, clear, and exact description of the invention, such as will enable others skilled in the art to which it appertains to make and use the same.

My invention has relation to improvements in culinary utensils, and more particularly to that class of pot or kettle protectors in which a perforated false bottom is employed in a pot or kettle to prevent burning the contents.

The object is to provide a simple, cheap, and effective device of this kind; and to this end the novelty consists in the construction, combination, and arrangement of the same, as will be hereinafter more fully described, and particularly pointed out in the claim.

In the accompanying drawings the same figures of reference indicate the same parts of the invention.

Figure 1:
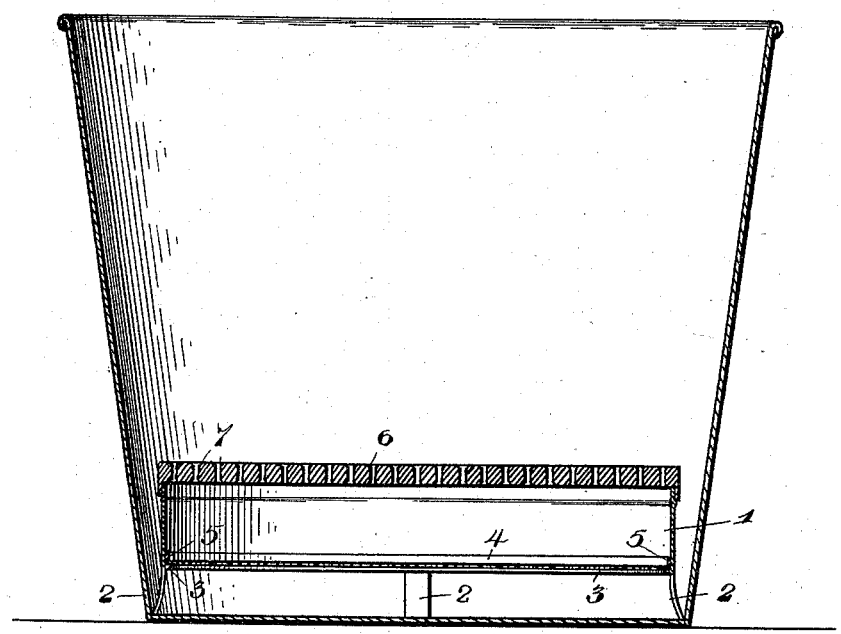
Figure 2:
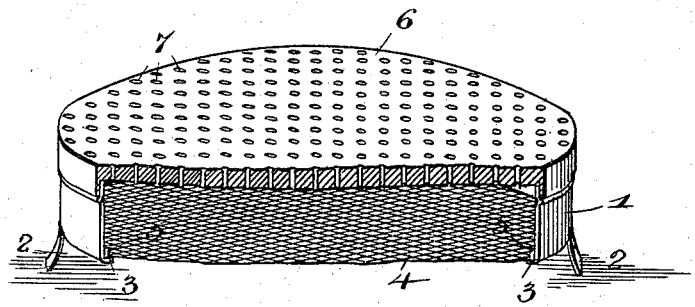

Figure 1 is a sectional elevation of a kettle, showing my improved kettle-protector in use; and Fig. 2 is a perspective view, partly in section, of the device removed from the kettle.

1 represents a shallow cylindrical vessel open at the top and bottom and provided with integral legs 2 and an internal annular flange 3, upon which rests a removable wire-gauze bottom 4, held in place by a spring-ring 5.

6 is a removable cover provided with countersunk perforations 7, having a smooth surface on its upper side.

The device is placed in the bottom of the kettle, the legs 2 2 resting on the inside of the bottom, and a sufficient amount of water is then put into the kettle to about the wire-gauze bottom 4. The article to be cooked is then placed on the perforated cover 6 and the whole placed on the stove with a comparatively air-tight cover on the kettle. As soon as steam begins to form it envelops the meat or other substance and thoroughly cooks the same without burning.

While a supply of water should always be kept in the bottom of the pot below the perforated cover 6, at the same time, should the water be exhausted in the pot, the contents cannot burn or become scorched, as the perforated cover prevents actual contact with the bottom of the pot and the gauze bottom allows a circulation of air to carry off the heat.

The device is very efficacious and durable and can be readily taken apart to thoroughly cleanse the same after use.

Having thus fully described my invention, what I claim as new and useful, and desire to secure by Letters Patent of the United States, is—

As a new article of manufacture, a kettle-protector, comprising the vessel 1 having an open top and bottom, the integral legs 2, and the integral annular flange 3, in combination with the removable wire-gauze bottom 4, the retaining spring-ring 5, and the perforated removable cover 6, substantially as shown and described.

In testimony whereof I hereunto affix my signature in presence of witnesses.

KIBBIE R. ACKERMANN.

Witnesses:
   GEO. F. HOWARD,
   JNO. C. CRABB,
   E. H. WALDEN.